United States Patent [19]
Kivolowitz et al.

[11] Patent Number: 5,754,180
[45] Date of Patent: May 19, 1998

[54] COMPUTER SYSTEM AND PROCESS FOR DEFINING AND MANIPULATING IMAGES USING STRUCTURED OBJECTS WITH VARIABLE EDGE CHARACTERISTICS

[75] Inventors: Perry S. Kivolowitz, Madison, Wis.; Sze-Ping Wong, Rochester, N.Y.

[73] Assignee: Avid Technology, Inc., Tewksbury, Mass.

[21] Appl. No.: 613,283

[22] Filed: Mar. 11, 1996

[51] Int. Cl.⁶ .................................................. G06T 9/20
[52] U.S. Cl. .................................................. 345/418
[58] Field of Search .................... 395/118, 119, 395/131, 133; 345/418, 419, 431, 433

[56] References Cited

U.S. PATENT DOCUMENTS

| | | | |
|---|---|---|---|
| 4,602,286 | 7/1986 | Kellar et al. | 358/183 |
| 5,153,937 | 10/1992 | Wobermin et al. | 395/131 |
| 5,179,641 | 1/1993 | Comins et al. | 345/432 |
| 5,339,387 | 8/1994 | Frankel | 345/431 |
| 5,392,385 | 2/1995 | Evangelisti et al. | 395/131 |
| 5,420,971 | 5/1995 | Westerink et al. | 395/133 |
| 5,438,651 | 8/1995 | Suzuki et al. | 395/133 |
| 5,479,590 | 12/1995 | Lin | 395/133 |
| 5,644,364 | 7/1997 | Kurtze et al. | 348/584 |

FOREIGN PATENT DOCUMENTS

| | | |
|---|---|---|
| 0 494 325 A1 | 7/1992 | European Pat. Off. |
| 0 512 839 A2 | 11/1992 | European Pat. Off. |

Primary Examiner—Phu K. Nguyen
Assistant Examiner—Cliff N. Vo
Attorney, Agent, or Firm—Wolf, Greenfield & Sacks, P.C.

[57] ABSTRACT

An image representation using a structured object may be readily manipulated by a computer. This image representation can represent more complex images where the structured object defines a boundary for which image values near the boundary in a region are defined by a function called an edge characteristic function. The edge characteristic function is applied by determining, for each point in the region, a point on the boundary to which the given point is closest, herein called an anchor, and a distance to that point. Different edge characteristic functions may be assigned to different points along the boundary. In one embodiment, edge characteristic functions are assigned to selected characteristic points on the boundary. These edge characteristic functions may be interpolated to provide edge characteristic functions for remaining points along the boundary. Each point not on the boundary is processed according to the edge characteristic function of the point on the boundary to which it is closest and according to the distance to that point. An edge characteristic function may also be a function of other factors. This image representation provides many benefits including the ability to generate more complex images which call then be manipulated more easily or be converted from different image formats. One form of manipulation is interpolation over time. In image compositing, this image representation also allows for easy attenuation of various effects over regions in a controlled way.

38 Claims, 13 Drawing Sheets

```
Color PickColor(double dist)
{
double s = (dist+1)/2;
return ColorA * (1-s) + ColorB * s;
}
```

Fig. 8A

```
static Color colorA, colorB, colorC;
// initialize colorA, colorB and colorC.
Color MixColor(double mixA, double mixBC)
//      mixA and mixBC both weights between 0 and 1.
{
        return ( colorA*(1-mixA) +(colorB*(1mixBC)+colorC*mixBC)*mixA );
} double Ramp( double dist )
//      dist between -1 and 1, returns a ramped value between 0 and 1
{
#define WHITEOUT (0.5)
        if ( dist > WHITEOUT )
        {
                return 1;
        }
        else
        {
                double s = (dist+1)/(WHITEOUT+1);       // map to [0,1]
                return s*s*(3-2*s);                     // smooth ramp
        }
}

Color PickColor(double dist, double anch)
{
        return MixColor( Ramp(dist), (anch<0.5)? anch*2: (1-anch)*2 );

COMPUTER SYSTEM AND PROCESS FOR DEFINING AND MANIPULATING IMAGES USING STRUCTURED OBJECTS WITH VARIABLE EDGE CHARACTERISTICS

FIELD OF THE INVENTION

The invention is related to computer systems and computer-implemented processes for defining and manipulating a region of interest in a coordinate space, such as for defining structured objects in two- or three-dimensional space using a computer. In particular, this invention is useful for generating a control image for use in compositing images.

BACKGROUND OF THE INVENTION

In a computer system, there are many ways to represent still image data which generally fall into one of two categories. In a first category of image representation, called a bit map, the value of each individual picture element, or pixel, of the image is stored. The image representation may be compressed or uncompressed. Bit-mapped image representations generally do not require much computation by a computer to display, but may occupy a substantial amount of memory space. Also, such image representations are generally not flexible and are difficult to scale or otherwise modify without generating significant visual artifacts. A second category of image representation is a structured object. A structured object defines an image, typically in mathematical terms, according to the structure of objects contained within the image. For example, an image of a cube may be represented by the positions of the vertices of the cube with respect to some reference point. Such structured objects are commonly found in three-dimensional modeling systems, desktop publishing systems, etc.

One area where image representation is important is in image compositing. One type of image compositing, called alpha compositing, involves combining two images to generate a third image, where the extent of contribution of each of the combined images in the third image is defined by a control image. An example of an alpha compositing system is found in U.S. Pat. No. 4,602,286 to Paul Kellar.

As described in the Kellar patent, the control image is defined as a bit-mapped picture, in which each pixel has a value. The value of each pixel represents an alpha value ($\alpha$) on the scale of zero (0) to one (1). The alpha value ($\alpha_{x,y}$) for each pixel (x,y), herein called a control value, in the control image is used in a standard mapping function to combine the input images. For example, for each pixel $A_{x,y}$ in the first input image (A), and pixel $B_{x,y}$ in the second input image (B), where A and B are images of x by y pixels, the pixel $C_{x,y}$ in the output image C is given by the formula:

$$C_{x,y} = \alpha_{x,y} A_{x,y} + (1-\alpha_{x,y}) B_{x,y} \qquad (1)$$

Such compositing appears in video programs as special effects and transitions Such as wipes, fades, etc. One difficulty with using a bit-mapped image as a control image is that alpha compositing often involves an interpolation over time, such as in transitions between cuts in a motion video sequence. That is, a control image used to combine one pair of frames to produce one frame in the motion video sequence is often different from control images used to produce other frames in the sequence. Additionally, if a bit-mapped control image created at a low resolution is then scaled to a higher resolution quantization found in the low resolution image produces artifacts in the higher resolution image.

Another way to define a control image is by using a structured object. A structured object defines a control images typically in mathematical terms, by the structure of objects within the image. This definition may be a mathematical formula, such as an equation representing a curve, or geometric, such as coordinates of points and vectors representing directions and magnitudes. The structured object definition is interpreted to obtain control values for each pixel to be generated in a final image. When taken together these control values are similar to the set of control values obtained using, a bit-mapped image.

One benefit of structured definitions is that they can be scaled, animated or interpolated over time more easily than static definitions, such as a bit-mapped image. Another advantage of using structured objects is that the computational determination of whether one part of the image is either inside or outside a boundary of an object is relatively easy. Structured object definitions also are more amenable to scaling and simple manipulation like rotations, which simplifies the process of making some effects. However, structured objects to date have been used generally for simple operations on simple objects.

In image compositing, both bit-mapped images and structured object definitions generally are used for generating a control image that typically has control values either 0 or 1, where the changes between pixels in the image define edges. Usually the edges or boundaries are processed to provide a blending characteristic such that changes between source content in the resultant image do not occur disjointly over only one pixel. Rather, the control image is processed such that all edges have a gradual change, typically a simple greyscale ramp. In the Kellar patent, this greyscale ramp is provided because of an artifact in processing input from a pen and tablet input device. Using structured objects, most prior art systems simply adjust values before and after an edge in a scanline.

A general aim of the invention is to provide an image representation, for a computer, which can represent more complex images and which is also readily manipulable.

SUMMARY OF THE INVENTION

An image representation using a structured object may be readily manipulated by a computer. This image representation can represent more complex images where the structured object defines a boundary for which image values near the boundary in a region are defined by a function called an edge characteristic function. The edge characteristic function is applied by determining for each point in the region a point on the boundary to which the given point is closest, herein called an anchor, and a distance to that point.

Different edge characteristic functions may be assigned to different points along the boundary. In one embodiment, edge characteristic functions are assigned to selected characteristic points on the boundary. These edge characteristic functions may be interpolated to provide edge characteristic functions for remaining points along the boundary. Each point not on the boundary is processed according to the edge characteristic function of the point on the boundary to which it is closest and according to the distance to that point. An edge characteristic function may also be a function of other factors.

This image representation provides many benefits including the ability to generate more complex images which can then be manipulated more easily or be converted from different image formats. One form of manipulation is interpolation over time. In image compositing, this image representation also allows for easy attenuation of various effects over regions in a controlled way. This method is particularly useful in image compositing and for modeling data which may vary over a number of parameters.

Accordingly, one aspect of the present invention is a method for generating an image. This method involves defining a curve in the image as a plurality of points. For at least two points in the curve, a function is assigned. The function of one of the points is different from the function of another of the points. For each picture element in the image, an anchor on the curve and a signed distance to the anchor are determined. For each picture element, the function assigned to the anchor of the point is selected. For each picture element in the image, the selected function is applied to the signed distance from the picture element to the anchor to determine image data for the picture element. A signed distance is a distance measure which is negative or positive, rather than an absolute value, and is useful for indicating a direction for example.

In one embodiment of this method, the step of assigning a function to a point involves selecting a plurality of points on the boundary. An edge characteristic is assigned to each selected point. The edge characteristics of each of the selected points are interpolated to obtain edge characteristics of other points on the boundary.

In another embodiment of this method, the step of applying the function involves calculating, for each point, a factor $\alpha$ according to the anchor and the distance, and wherein the image data for the point is $\alpha A+(1-\alpha)B$, where A is image data from a corresponding point in a first image and B is image data from a corresponding point in a second image.

Another aspect of the invention is a computer-readable medium having a representation of a region of interest within a coordinate space stored thereon in a computer-readable form. This representation includes an indication of a boundary defined by a plurality of points in the region, and, for at least two points of the boundary, an indication of an edge characteristic, wherein the edge characteristic of a first point and the edge characteristic of a second point are different. In one embodiment, the representation includes an indication, for each point in the coordinate space, of a point on the boundary to which the point is closest and a signed distance to the point on the boundary.

Another aspect of the invention is a computer-readable medium having a representation of a region of interest within a coordinate space stored thereon in a computer-readable form. The representation includes an indication of a boundary defined by a plurality of points in the region and an indication, for each point in the coordinate space, of a point on the boundary to which the point is closest and a signed distance to the point on the boundary.

Another aspect of the invention is a computer-implemented process for generating a representation of a region of interest in a coordinate space. The process involves defining a boundary in response to user input. User input is also received for at least two points on the boundary, and an edge characteristic is assigned according to the user input, wherein the edge characteristic of a first point and the edge characteristic of a second point are different.

Another aspect of the invention is a computer system for generating a representation of a region of interest in a finite coordinate space. This computer system has a mechanism for defining a boundary. Another mechanism is used for assigning an edge characteristic for at least two points on the boundary wherein the edge characteristic of a first point and the edge characteristic of second points are different.

Another aspect of the invention is a computer-implemented process for manipulating a definition of a region of interest in a coordinate space, wherein the definition is stored using computer-readable signals on a computer-readable medium, and wherein the definition includes an indication of a boundary defined by a plurality of points in the region and an indication, for each point in the coordinate space, of a point on the boundary to which the point is closest and a signed distance to the point on the boundary. This process involves applying, for each point in the coordinate space having an anchor and a signed distance to that anchor, the edge characteristic function assigned to the anchor to the signed distance stored to obtain a value. The point in the coordinate space is displayed according to the obtained value.

BRIEF DESCRIPTION OF THE DRAWING

In the drawing,

FIGS. 8A and 8B are pseudocode representing example edge characteristic definitions;

DETAILED DESCRIPTION

The present invention will be more completely understood through the following detailed description which should be read in conjunction with the attached drawing in which similar reference numbers indicate similar structures.

The invention relates to the delineation of a region of interest in a coordinate space which is a subset of a larger region in the space. One type of delineation of a region of interest is the selection of a subset of an image which is treated differently from the rest of the image. Treatment may mean any of a plurality of image processing functions including but not limited to, painting, compositing, transitions and special effects. Another kind of delineation of a region of interest, without relation to imaging, is the delineation of a geographical region for which some demographic characteristic applies. An example in three-dimensional space involves description of the animation of a fireball in motion, such as a comet, which includes the body and tail of the comet.

Figure 1A:
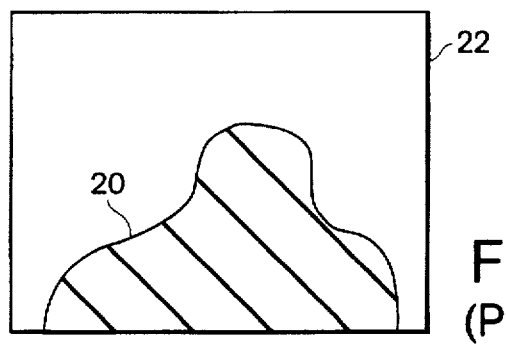
FIGS. 1A and 1B illustrate a bit-mapped image definition of a control image for use in alpha compositing in a prior art system, and an associated blending characteristic.
Figure 1B:
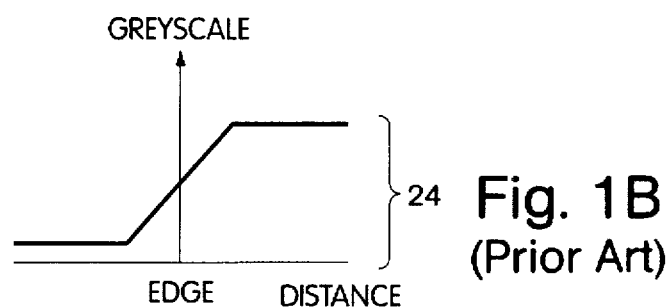

Referring now to FIG. 1A, in a prior image processing system, a region is delineated using, a bit-mapped image which is generated by a user using a pen and tablet input device (not shown). This input device allows a user to define a line such as shown at 20 in the image 22 of FIG. 1A. Referring now to FIG. 1B, by virtue of the sloped shape of the tip of the pen, an edge having a mathematical characteristic such as shown at 24 is provided. When viewed, the edge defined by line 20 appears to have a short grey scale ramp. The graph shown at 24 illustrates grey scale values with respect to a distance from the boundary.

Figure 2A:
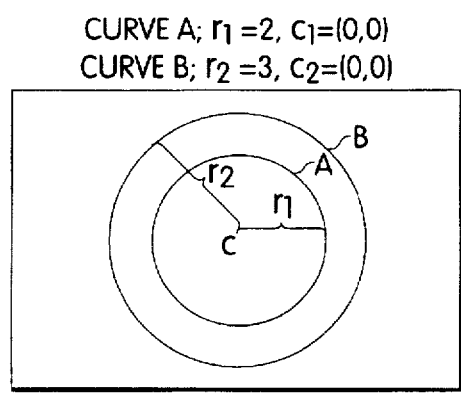
FIGS. 2A and 2B illustrate a control image defined using a structured object in accordance with a prior art methodology and an associated blending characteristic.
Figure 2B:
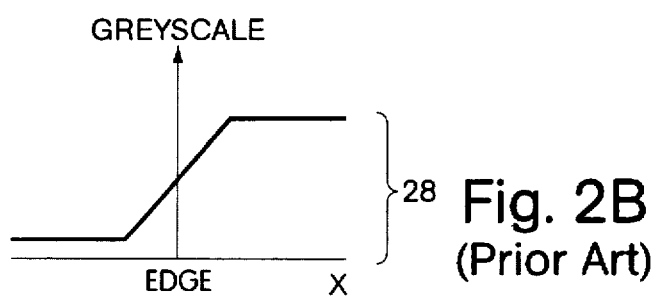
Figure 3A:
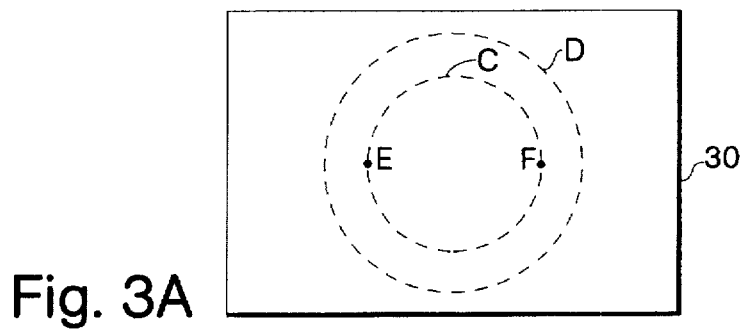
FIGS. 3A–3E illustrate a control image defined using a structured object representation in accordance with the present invention, and associated edge characteristic functions.
Figure 3B:
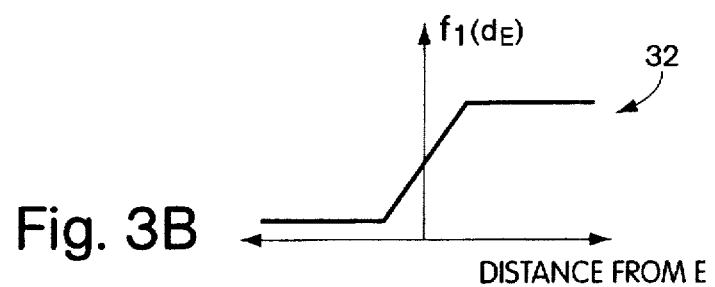
Figure 3C:
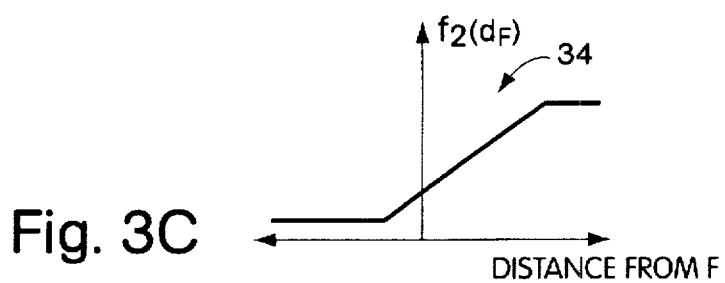
Figure 3D:
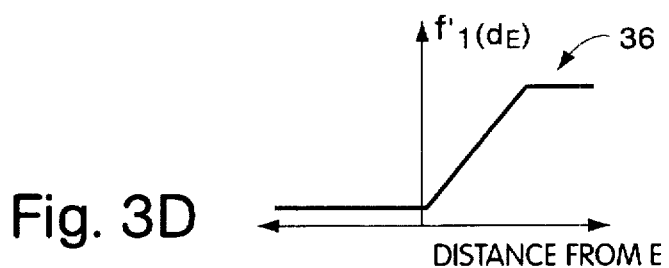
Figure 3E:
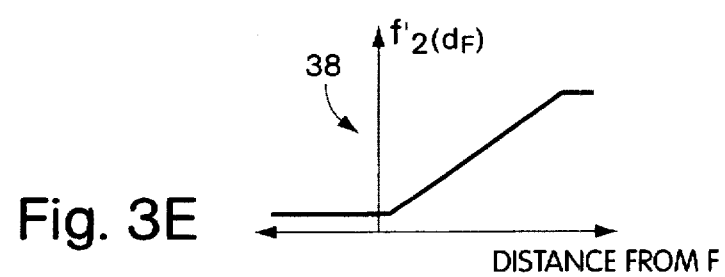

Referring now to FIG. 2A, in prior systems using structured objects, an image 26 may include an object such as the circle defined at A. A circle may be defined by its radius, e.g., two, and its center, e.g., coordinates (0,0), within the coordinate space of the image. Referring now to FIG. 2B, a function, such as shown at 28, may define a greyscale ramp in the x direction across the boundary defined by the structured object A to provide a desired edge smoothing. When processed, a point within the image 26 may be assigned a greyscale value according to how far it is from the boundary defined by the structured object A. In practice, given a point on the boundary defined by the structured object, this function 28 is used to identify other points close to the point on the boundary and to assign greyscale values to these identified points.

An advantage of a structured object definition is that interpolation of the structured object over time, e.g., changing its shape, is easy to perform. For example, an enlarged circle having an enlarged radius, e.g., three, and the same center coordinates is shown at B in the image 26. As can clearly be seen, the size of this circle can be modified easily by incrementing, or decrementing the radius value. Its position can he changed easily by moving the center coordinate.

These solutions from image processing applications involve only indirectly the notion of "proximity" in the determination of the blending characteristic at the boundary defined by the structured object. It has been found that a direct measure and use of the proximity of a point to a boundary permits the representation of more complex objects.

Proximity is a signed measure of how far a point is from the edge of the region defined by the structured object. For example, the measure may be positive if the point is inside the region, or negative if the point is outside the region. If the color black (white) is assigned to all outside (inside) points which are not close to the edge, and a ramp of greyscales is assigned for those near the edge, the region is manifested as a white area on a black background with a ramped transition from white to black on the edge of the region. The shape of the greyscale ramp, which controls the shades near the edge, is called the edge characteristic of the region. Different greyscale ramps give rise to different edge characteristics, and thus different delineations of the region. In the image representation shown in FIGS. 1A and 1B, an edge characteristic is not defined explicitly. The blending characteristic near the edge is really a desirable side-effect of the input device. In the image representation shown in FIGS. 2A and 2B, only one blending characteristic is assigned per region. Additionally, the blending characteristic is processed with respect to a point on the boundary of the region in order to identify points in the coordinate space proximate to the boundary point. In contrast, in the present invention, proximity is defined with respect to a point in the region, in order to identify a point on the boundary to which the given point is closest.

Referring now to FIGS. 3A–3F, the present invention permits different edge characteristic functions at different points alone a curve defined by a structured object. For example, a circular region C may be delineated by a structured object definition. Variable edge characteristic functions assigned around the edge of the circle represent a circular disk with a greyscale ramp with a different appearance in every direction. For example, a point E on the edge of the circle in FIG. 3A may be assigned a first edge characteristic function $f_1(E)$ Such as shown at 32 in FIG. 3B. A second point F at the opposite side of the edge of the circle in FIG. 3A may be assigned a different edge characteristic function $f_2(F)$ such as shown at 34 in FIG. 3C. Tis combination of edge characteristics results in a shape that looks like an egg with an egg yolk.

Such an image representation may be interpolated easily over time. For example, the radius may be changed to produce a curve as shown at D in FIG. 3A. Alternatively, edge characteristics assigned to points E and F on the curve may change, for example to be new functions $f_1'(E)$ and $f_2'(F)$ Such as shown at 36 and 38.

Figure 4:
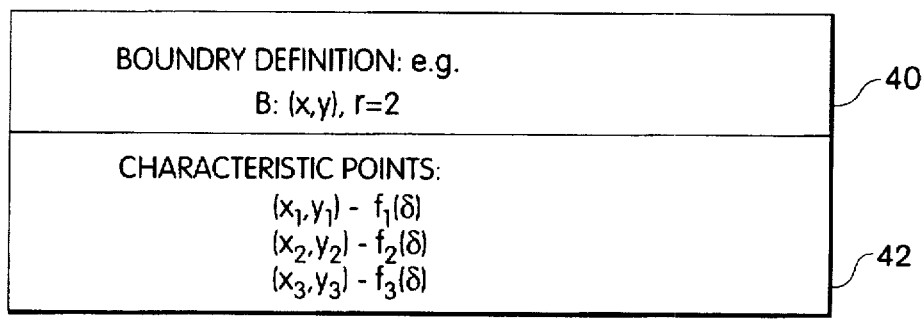
FIG. 4 is a schematic illustration of a representation of a structured object definition in accordance with the present invention.

Referring now to FIG. 4, a representation of a delineation of a region of interest within a coordinate space such as a two dimensional image is illustrated. Such a representation generally includes an indication of a definition of a structured object which provides a boundary, such as indicated at 40. In the example given, the boundary of a circle is defined by a center point and a radius. The image representation also includes an indication of one or two or more edge characteristic functions, such as shown at 42, which are assigned, respectively, to characteristic points on the boundary.

Figure 5:
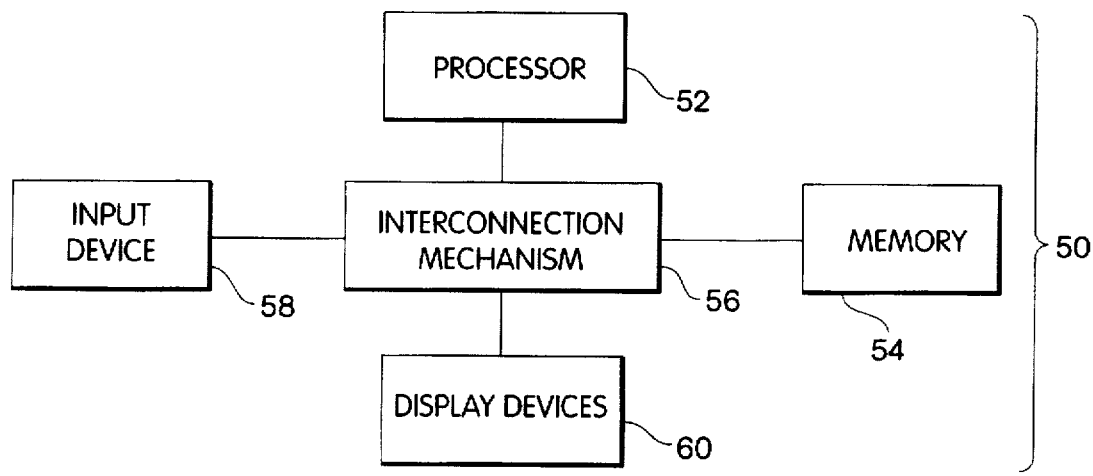
FIG. 5 is a block diagram of a computer system with which the present invention may be used.

This representation of a delineation of a region of interest is used by a computer system 50, for example, as shown in FIG. 5. The computer system 50 includes a processor 52 connected to a memory 54 via an interconnection mechanism 56. Input devices 58 and display devices 60 are also connected to the processor and memory via interconnection mechanism 56. The computer may be programmed using a high-level programming language, such as "C", or other programming language to create an application program, which is machine-executable code created by compiling a computer file containing a program in the high-level programming language. An operating system (not shown) controls the execution of the application program and provides scheduling, debugging, input/output, memory management, data management and related services on the computer.

The computer system 50 may be any of number of commercially-available general purpose computing systems, for example, the Indigo computer from Silicon Graphics, Inc. of Mountain View, Calif., using the IRIX operating system similar computers available from Apple Computer, or other custom image processing work stations and other programming systems. Such computer systems employ commonly available processors, such as the Intel Pentium or series x86 processors or Motorola series 680x0 processor, for example. Other suitably programmed microprocessors may be used. The interconnection mechanism 56 may be a simple bus, or may involve a more complex switching arrangement to allow the various elements of the computer system to communicate in parallel. It should also be understood that the invention is not limited to a single processor system. A multi-processor system, including parallel processing computers, may be used in the present invention.

Exemplary input devices which may be used with the present invention include a mouse, a track ball, a pen and tablet, or other pointing devices, as well as keyboards, keypads, scanners and other commonly used input devices for general purpose computers. The display device 60 may be a cathode ray tube (CRT) display, liquid crystal display (LCD), of which there are a number of types, and other display devices such as a printer. In cases where this invention is used to generate motion picture sequences, the display device 10 may be an optical printing device, or a video tape recorder.

Figure 6:
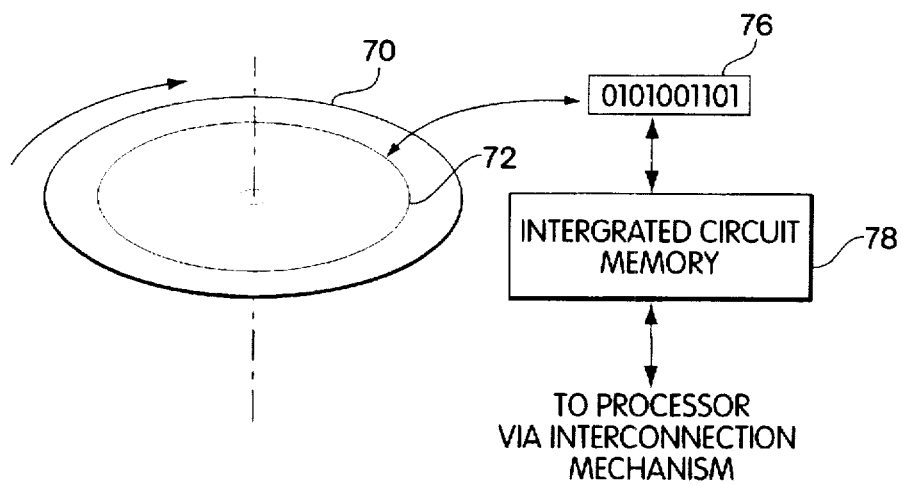
FIG. 6 is a schematic illustration of more details of a memory system shown in FIG. 3.

FIG. 6 shows more details about the memory system 54 of FIG. 5. The memory system includes a computer readable and writable, random access, nonvolatile recording medium 70, such as a magnetic or magneto-optic disk. The disk may be removable, known as a floppy disk or compact disk, or permanent, known as a hard drive. Such a disk has a number of tracks such as indicated at 72 in which signals are stored, typically in binary form, i.e., a form interpreted as a sequence of ones and zeros as shown at 76. Such a sequence of ones and zeros provides an indication of the boundary definitions, characteristic points and associated edge characteristic functions such as shown in FIG. 4. This information is stored on the disk 70. Typically, in operation, the processor causes the data to be read from disk 70 into an integrated circuit memory element such as indicated at 78. The integrated circuit memory 78 allows faster access to the information than does the disk 70. The processor generally manipulates the data within the integrated circuit memory and then copies the data to the disk 70 when processing is completed. A variety of mechanisms are known for managing data movement between the disk 70 and integrated circuit memory 78, and the invention is not limited thereto. The invention is also not limited to the particular processor, input device, output device or interconnection mechanism.

Figure 7:
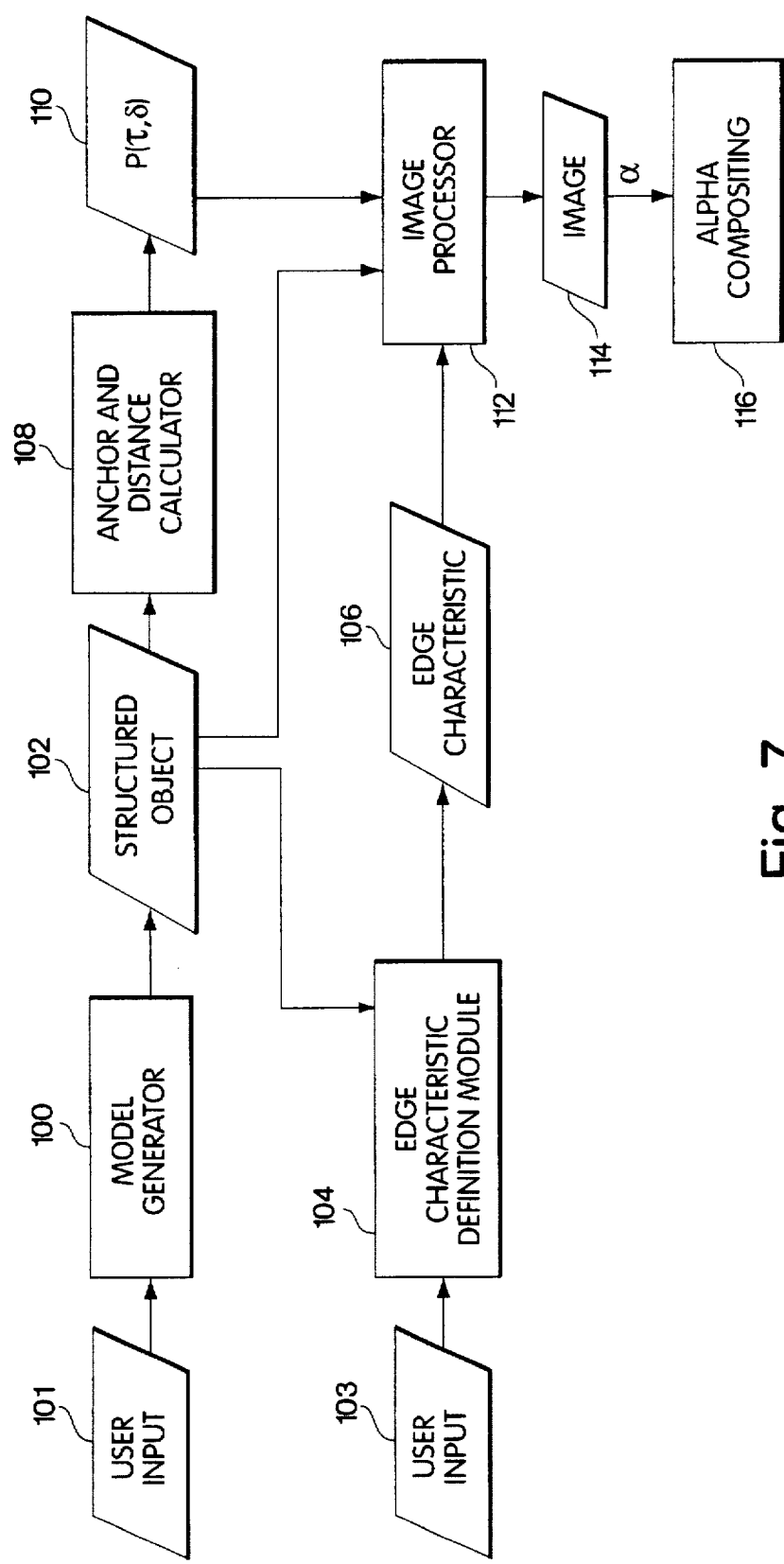
FIG. 7 is a block diagram of a system for processing structured object definitions in accordance with the present invention.

One embodiment of a system in accordance with the invention will now be described in connection with FIG. 7. Such system may be implemented using a high-level computer programming language on a computer system, such as described above in connection with FIGS. 5 and 6. One module of this system is the model generator 100 which receives user input 101, typically via a graphical user interface and in response generates the structured objects that are used to define a boundary within a coordinate space. The model generator 100 may be, for example, matte generation software, such as found in Matador from Avid Technology Europe Ltd., formerly Parallax, of London, England, Elastic Reality from Avid Technology, formerly from Elastic Reality in Madison, Wisconsin and Photoshop, from Adobe Systems. Inc., in Mountain View, Calif. Such systems allow a user to generate a matte using an input device. The matte may be output to a file as a representation of a boundary. The boundary so generated, as indicated in 102, may be stored in the memory 54 of the computer.

Another module is the edge characteristic definition module 104 which receives user input 103 and which enables a user to define an edge characteristic function as indicated at 106. An edge characteristic function may be associated with one or more characteristic points on a boundary defined by a structured object. An interpolation may be performed, or the edge characteristic may be defined, so as to provide a single definition which applies to the whole object as a function of a position on the boundary. The definition of the edge characteristic function also may be stored in the computer memory 54. The combination of edge characteristic function 106 and boundary 102 is sufficient to describe a delineation of a region of interest in the coordinate space in which the structured object is defined.

An anchor and distance calculation module 108 determines, in a manner described in more detail below in connection with FIGS. 9A–9D, for each point in a coordinate space, the point on the boundary to which it is closest (herein called an anchor), along with a distance measure to that boundary. The anchor and distance for each point, as indicated at 110, is stored in the memory 54 of the computer. The distance measure may be a signed distance, for example. A signed distance is a distance measure which is negative or positive, rather than an absolute value, and is useful for indicating a direction for example.

It is possible to provide a collection of structured object definitions in this invention. In some applications it may be preferable to pre-compute the anchor and distance values for a given structured object. In such a case the combination of boundary definitions 102 and anchor and distance values 110 are stored together in the memory 54 for later use. Edge characteristic functions 106 can be defined at a later time. Additionally, a set of structured objects and corresponding edge characteristics 106 may be combined to provide for example a library of visual effects.

An image processor 112 receives the boundary definition or structured object definition 102 the anchor and distance values 110 and the edge characteristic functions 106 to produce an image 114. The process performed by the image processor is described in more detail below in connection with FIG. 10. It is possible to combine the functions of both the anchor and distance calculator 108 and the image processor 112 into one module that performs both operations on a per pixel, per scanline basis. The image 114 may be representative of data to be displayed or may be used as a control image in an alpha compositing system 116. Other applications and uses of this image are described in more detail below.

FIGS. 8A and 8B which illustrate example edge characteristic definitions in more detail, will now be described. These definitions can be made using, a program editor such as EMACS to generate computer code defining the edge characteristic as a procedure receiving two arguments, the anchor and the distance.

In this implementation, shown in "C" pseudocode, the edge characteristic of the region is determined by function Color PickColor (double dist, double anch), where dist is the signed distance of the current point P from the edge C of the region and anch is the anchor of P from C. Anch is a normalized value between 0 and 1 with respect to a predetermined point on the boundary C. Hence the values 0 and 1 of anch both represent the same point on C when C is closed. Similarly, dist is a value between −1 and 1, with the convention that dist is negative if P is outside the region and positive if P is inside the region defined by C. A maximal footprint (MAXDIST) is used for the edge characteristic so that dist*MAXDIST gives the actual distance of P from C.

A simple edge characteristic function is shown in FIG. 8A. This function is independent of anch. The color this edge characteristic function returns is radially symmetric (i.e., this function is the same function along any radius of constant anchor). On any path of constant anchor, the color returned is on a straight ramp between colorA (the color at dist=1) and colorB (color at dist=1). By carefully choosing the two end colors, and possibly the ramp between them one can produce quality delineations of regions like soft edges, etc.

The power and flexibility of this image representation is demonstrated by the definition of an edge characteristic function as shown in FIG. 8B. In this edge characteristic function. MixColor() is a simple blend function which mixes colorA with another color which is obtained by mixing colorB and colorC. Ramp() is a smooth function which maps [−1,1] to [0,1], the domain of the function MixColor(). Ramp() returns 0 at −1,1 on the interval [WHITEOUT,1] and it is a smooth cubic ramp on the interval [−1, WHITEOUT], where WHITEOUT is a constant, e.g., 0.5.

In the definition of PickColor(), the color is chosen by an application of the MixColor() function with two carefully chosen arguments. The first argument, Ramp(dist), ensures a radially smooth transition of colors in the region. With the flat portion on [WHITEOUT,1], the center of the region is assigned a uniform color (colorA). Moving away from the center, the color changes to another color, which is controlled by the second argument:

(anch<0.5)?anch*2: (1−anch)*2 which means that if anch less than 0.5, the value is anch*2, else the value is (1−anch)*2. This argument defines a hat-shaped function which is zero at anch=0 or 1 and rises to 1 at anch=0.5. This function causes the color at the outermost rim of the delineated region to change from colorB (anch=0) to colorC (anch=0.5) then back to colorB (anch==1.0). The fact that the anchor value anch is periodic means that PickColor() should also be periodic with respect to anch.

Given the definition of a structured object, the process of determining the signed distance and anchor on the curve defined by the structured object for each picture element in the coordinate space will now be described in connection with FIGS. 9A through 9D.

Figure 9A:
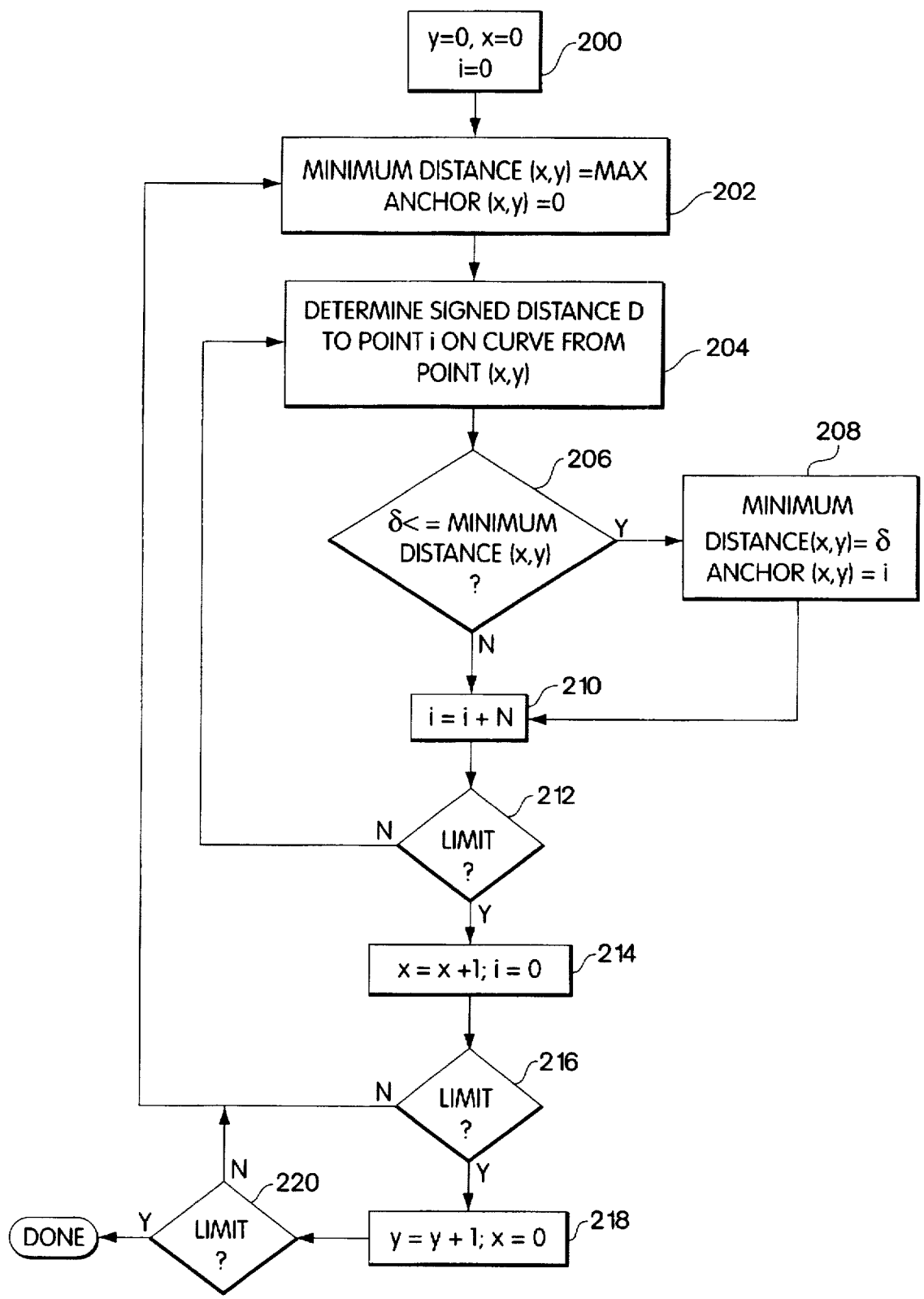
FIG. 9A is a flow chart describing a process for determining, anchor and distance values performed by anchor and distance calculator in FIG. 7.
Figure 9B:
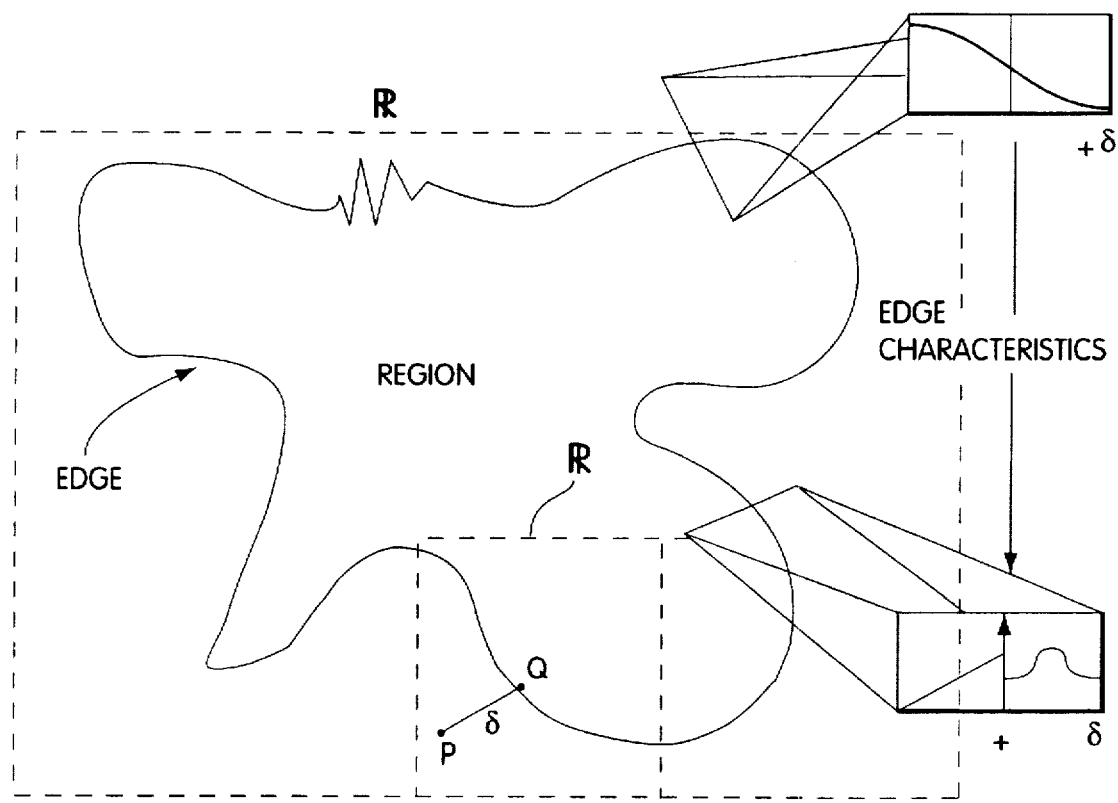
FIG. 9B is a schematic illustration of a structured object delineating a region within a coordinate space.

FIG. 9A is a flow chart describing how anchor and distance values may be calculated using the structured object definition 102. FIG. 9B is a schematic illustration of a coordinate space R with a region delineated using a structured object.

In this process, the curve is parametrized such that each point defining the edge of the region is assigned a value i. There are many ways to parametrize a curve. In the embodiment described herein, an initial point on the curve is assigned parameter i=0, and the final point on the curve is assigned the parameter i=1. The purpose of the process defined in FIG. 9A is to determine, for each point P in the coordinate space R, 1) the point Q on the edge defining the region which is the nearest point on the edge to point P, and 2) the signed distance between point P and point Q.

The first step in this process is step 200 initializing x and y values, representing pixel coordinates for the points in the curve to be scanned, as well as the parameter value i of the curve. Typically, this initialization sets corresponding variables to zero. Of course other initial values may be used. Next, the minimum distance value and an initial anchor are selected in step 202 to initial values. For example, the minimum distance value may be set to the highest possible value which is expected using the given coordinate space, and the anchor is set to indicate the lowest parameter value, e.g., zero.

Given the initialized values, the signed distance δ between the Current point (x,y) and the Current point i on the curve is determined in step 204. If the distance δ so calculated is less than or equal to the minimum distance presently stored, as determined step 206, the minimum distance for the current point is set to this calculated distance δ in step 208 and the anchor value for this point (x,y) is set to the current parameter value i. The parameter value i is then updated in step 210 by incrementing by a value N, which is 1/(M−1), where M is the number of points on the curve. If all of the points on the curve have not been analyzed, as determined in step 212, the loop of steps 204, 206, 208 and 210 is repeated.

When all of the points on the curve have been analyzed, the minimum distance for the present point (x,y) and its anchor, have now been defined. The next point in the x direction is then selected by incrementing the x value in step 214 and resetting the parameter value i to its initial value, e.g., zero. All points in the scan line are then visited by continuing to perform steps 202 through 214 until the end of the scan line is reached as determined by step 216. When the end of the scan line is reached, the y value is incremented in step 218 and the x value is initialized, e.g., to zero. Each scan line is processed in accordance with steps 202 through 218 until all scan lines have been processed as determined by step 220. Upon the completion of step 220, the minimum distance for each point and its anchor is determined.

The process described in connection with FIG. 9A is illustrated for only two dimensions. An extension of this process to three dimensions is relatively simple by adding an additional loop having steps similar to steps 218, 220 and a link back to step 202 for the third dimension to be processed.

In step 204, a distance metric is used to measure the distance between a point in the coordinate space and points on the curve. A simple distance metric to use is the Euclidean distance, or the squared Euclidean distance which avoids performing a square root operation. The Euclidean distance Δ of a point $(x_1,y_1)$ to another point $(x_2,y_2)$ in a coordinate space is represented by the following equation:

$$\|\Delta\| = \sqrt{(x_1 - x_2)^2 + (y_1 - y_2)^2} \quad \text{in two-dimensional space; and}$$

$$\|\Delta\| = \sqrt{(x_1 - x_2)^2 + (y_1 - y_2)^2 + (z_1 - z_2)^2} \quad \text{in three-dimensional space.}$$

Many other distance metrics are known for measuring, a difference or a similarity between two points. The Euclidean distance is merely an example of distance metrics to be used. This distance may be normalized to a range of [−1,1] by dividing the Euclidean distance by a factor MAXDIST, indicating a maximum possible distance in the region. The distance calculated may be a signed distance. One way to select a sign for the distance is to consider the curve as dividing the coordinate space into two regions. This is done by viewing the curve as moving forward in the coordinate space as the parameter value i increases. In a plane, this curve then divides the plane into two regions, one region to the right of the plane, another region to the left of the plane. In such a case, the signed distance between a point P in the coordinate space and the curve is defined to be positive if point P is on the right hand side of curve C; and negative if point P is on the left hand side of curve C.

Concerning the identification of the anchor, i.e., the point on the curve which is closest to a given point on the coordinate space, it is possible that two or more points on the curve may have the same distance to any given point in the coordinate space. In such a situation, one point should be selected. The process of selecting this point can be performed in the comparison and selection steps in steps 206 and 208 in FIG. 9A. In the embodiment shown in FIG. 9A, the point on the curve having the highest parameter value i is selected as the anchor. By making the comparison in step 206 only a "less than" comparison, the point on the curve with the lowest parameter value i could be selected. The same effect could be obtained by changing the orientation of the parametrization, or by changing the initialization and update steps 200 and 210, respectively.

The result of the process of FIG. 9A is information stored in memory for every point P in the coordinate space, representing two unique scalars:

τ, called the anchor of P; and

δ, its signed distance.

This mapping of point P to ordered pair (τ,δ) is called a delineation map of the curve C. The delineation map of a curve C can be represented by a variety of media, such as colors.

For example, a color map may be defined which assigns a color based on the anchor and signed distance with respect to the curve. Thus, a region is delineated via the delineation map.

The brute force approach to the calculation of the anchor and signed distance in FIG. 9A involves order O(Mxy) computation time, where M is the number of parameters representing the curve, and x.y represents the number of pixels in the image. A more efficient calculation is desirable.

Such a process will now be described in connection with FIGS. 9C and 9D. Similar to the embodiment of FIG. 9A, in this embodiment, in two dimensions a curve C is parametrized by a parametric value i which represents a pair of coordinates (x,y). Since a computer processes discrete pixels in essence the curve C is approximated by a piecewise linear curve where each piece is represented by parameter i and has two vertices—the point (x,y) corresponding to parameter i and the point (x,y) corresponding to parameter i-1. The curve C between successive vertices is assumed to be all the points lying on a straight line between the two vertices.

While computing the distance from a point P to a curve C may involve computing with infinitely many points on the curve, computing the distance from P to its piecewise linear approximant involves work only in the order of the number of vertices, as demonstrated by the process of FIG. 9A. The distance from P to C is defined to be the shortest distance from P to any point on C. There are two kinds of distances— radial distances and orthogonal distances. A radial distance is the distance, using some predefined metric such as the Euclidean metric, between P and any vertex of C. A radial distance can be visualized as defining a circular disk with a vertex as a center. Orthogonal distance is the distance, using the metric used to compute the radial distance between P and each straight line segment between two adjacent vertices of the piecewise linear curve. An orthogonal distance can be visualized by an infinite line drawn through P and in the direction orthogonal to the line segment. If this infinite line intersects the line segment at some point Q between the two vertices defining the line segment, then the orthogonal distance is defined and is equal to the distance between P and Q. On the other hand, if the point Q is not between the two vertices defining the line segment, the orthogonal distance between P and the line segment is undefined.

As described below in connection with FIG. 9D, this process actually determines the reverse. That is, given a scanline (*,y), where * stands for any x value between the left and right limits of the image, this process determines the x values on the scanline which have a well-defined orthogonal distance with a line segment defined by two vertices of the curve C. Additionally, the smallest orthogonal distance produced by these valid x-values is determined.

In the process of this embodiment, better performance is obtained by traversing the curve, vertex by vertex, and updating the distances and anchors in an array representing a scanline only as an update is needed between scanlines, instead of by computing a distance and anchor for each pixel in every scanline. This process takes advantage of the fact that the distance and anchor values depend on the maximum distance from the curve in which pixels are affected by the edge characteristics, defined by a value MAXDIST, and that only a few pixels in a scanline can be affected by a given point on the curve. Thus, the process of updating distance and anchor values for each scanline only as needed is accomplished by two steps. Referring now to FIG. 9E, first, for radial distances from the vertices, only those pixels within a maximum distance MAXDIST need to be updated. For example, only those points (between $x_0$ and $x_2$) on the scanline that are within a radial distance MAXDIST from a point $P_i$ on the curve need to be updated. Second, the x-intercepts on the current scanline of two lines which pass through the endpoints of each line segment (e.g., defined by $P_i$ and $P_i+1$) and which are normal to the line segment are computed easily. The orthogonal distance between points on the scanline and the line segment is also computed easily. Only those pixels between the two intercepts (e.g., $x_1$ and $x_3$,) need to be updated when the orthogonal distance is smaller than a maximum distance MAXDIST.

Figure 9C:
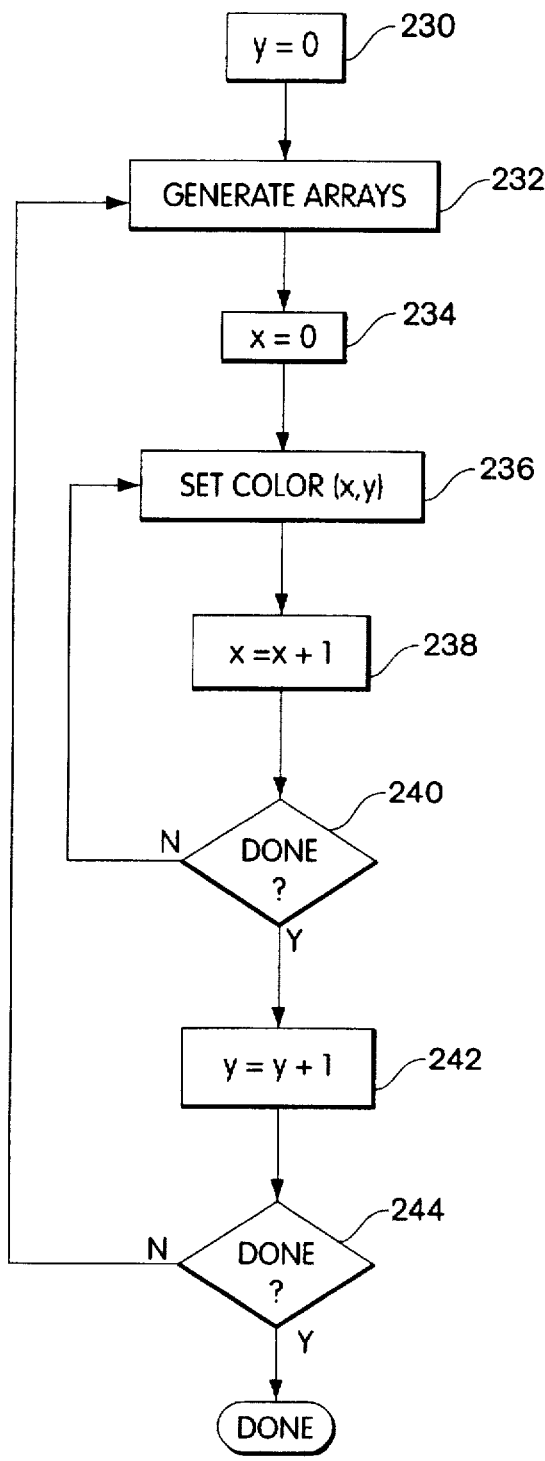
FIGS. 9C and 9D are flowcharts describing another process for determining anchor and distance measures.

Referring now the FIG. 9C, in this embodiment, an image is processed one scanline at a time. Thus, the first step is setting a y value to zero, in step 230. Two arrays are then generated for the scan line, in step 232. A first array is called the distance table and holds the current minimum distance to the curve for each point x along the scanline. The second array is called the anchor table and holds the current closest point on the curve for each point x along the scanline. Thus, the distance table and the anchor table are x-entry arrays, where x is the number of pixels in a scanline. The process of generating these arrays is described below in connection with FIG. 9D. Then, for each pixel in the scan line, a color is selected by steps 234 through 240. In particular, x is initialized to zero in step 234. The color for the pixel defined by the current x value and the current scanline is determined according to the distance and anchor values in the distance table and the anchor table for the current x value (step 236). X is incremented in step 238 and these steps are performed until the end of the scanline is reached as determined in step 240. These steps 234 to 240 may be performed separately, as part of the image processing module described below in connection with FIG. 10 if the distance table and anchor table is stored for each scanline. The y value is then incremented in step 242 to process subsequent scanlines until the final scanline has been processed as determined in step 244.

Figure 9D:
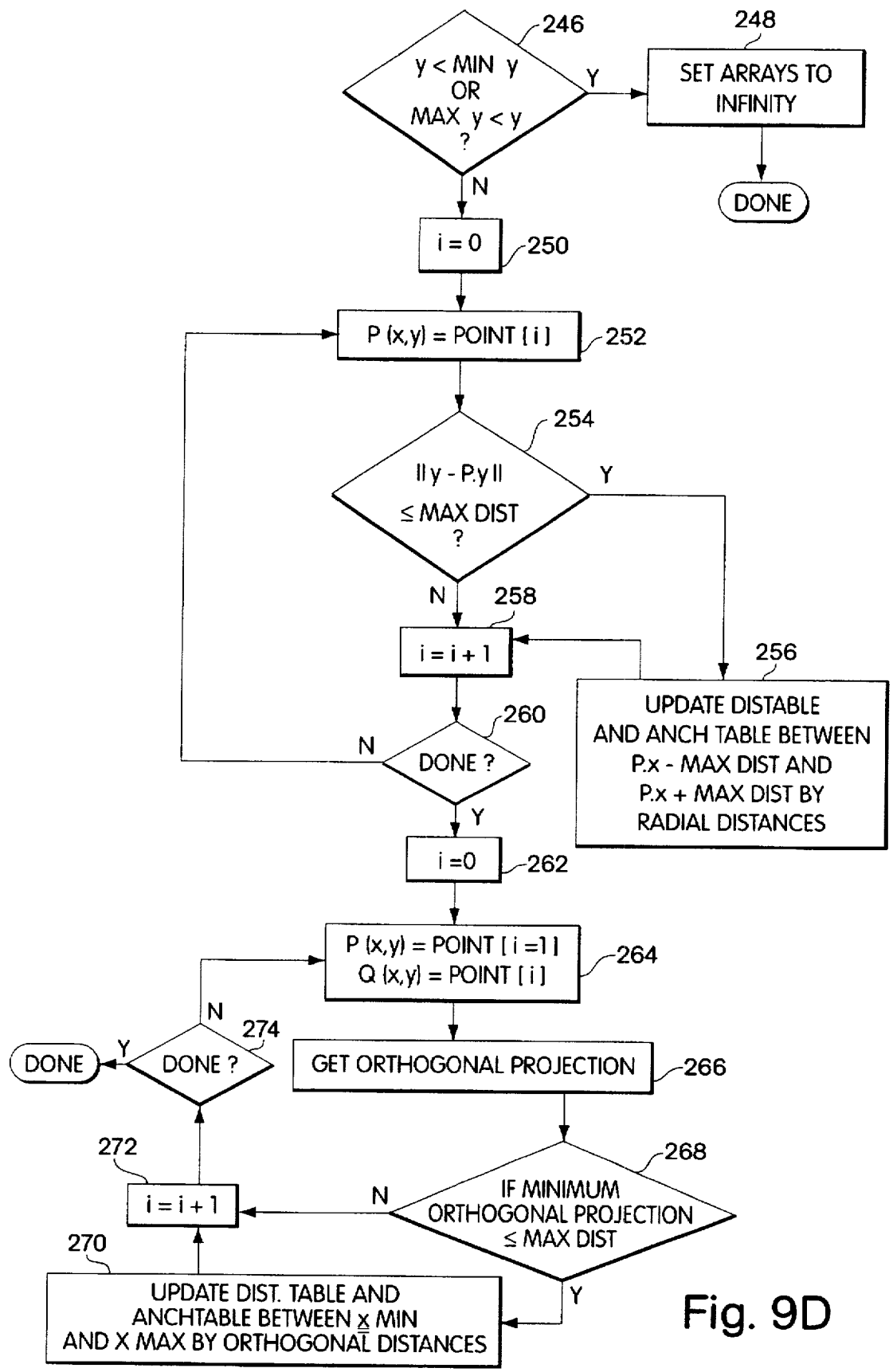
Figure 9E:
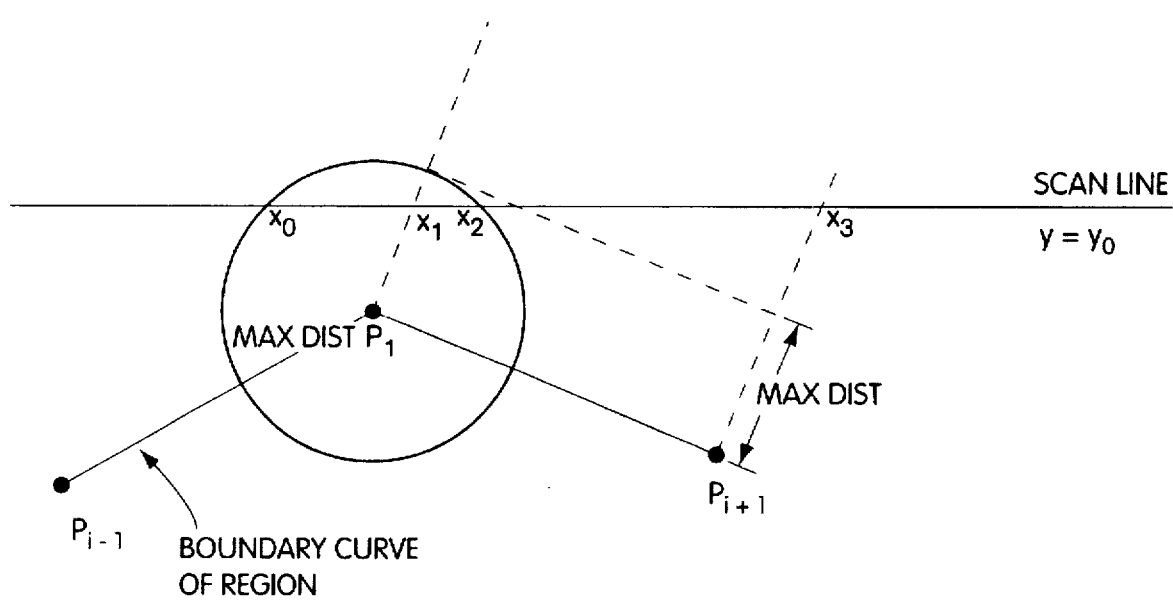
FIG. 9E is a diagram illustrating how radial distances and orthogonal distances are defined.

Referring now to FIG. 9D, the process of generating the distance and anchor tables will now be described. The first step of this process is determining whether the current scanline is within a bounding box defining the region of the image affected by the curve and its associated edge characteristics (step 246). In step 246, the scanline value y is compared to the minimum and maximum y values defining the bounding box. If the scanline is outside of the bounding box, the anchor and distance values are set to a default value, such as infinity, in step 248.

If the scanline is within the bounding box, a parameter value, e.g., i, is initialized in step 250 to an initial value, e.g.

zero. The pixel coordinates (x,y) of a point P corresponding to the current parameter i are then obtained in step 252. The distance along the y axis between this point and the current scanline is then compared to the value MAXDIST in step 254 to determine if this point may affect the distance and anchor values of the current scanline. Thus, if the distance is less than MAXDIST, the distance table and anchor table arrays are updated by the radial distances from point P for only those points within MAXDIST along the x axis of the point P in step 256. Thus, a distance, such as the Euclidean distance, is calculated between the point P and each point in the scanline between x−MAXDIST and x+MAXDIST, where x is the x coordinate of point P. This distance is compared to the current distance in the distance table for the point, and the distance table and anchor table is updated, using steps similar to steps 206 and 208 in FIG. 9A. Steps 252 through 256 are repeated for each parameter i, or each point along the curve, by incrementing i (step 258) until all points on the curve have been evaluated as determined in step 260.

The parameter value, e.g., i, is again initialized in step 262 to an initial value, e.g. zero. The pixel coordinates (x,y) of a point Q corresponding to the current parameter i, and pixel coordinates (x,y) of a point P corresponding to the previous parameter (i−1) are then obtained in step 264. The orthogonal projection of the scanline onto the line segment defined by points P and Q is then determined and the orthogonal distance to points P and Q from the scanline is computed in step 266. The orthogonal distances are compared to the value MAXDIST in step 268. If both of these lengths are greater than MAXDIST, these points do not affect the distance and anchor values of the scanline. Otherwise, the distance table and anchor table are updated in step 270 between the minimum x point oil the scanline and the maximum x point on the scanline corresponding to the orthogonal projections of the scanline on the line segment defined by points P and Q. That is, for each point along the scanline between the minimum and maximum x points, the orthogonal distance to the line segment defined by points P and Q is calculated. This distance is compared to the current distance in the distance table for the point, and the distance table and anchor table is updated, using steps similar to steps 206 and 208 in FIG. 9A. Steps 264 through 270 are repeated for each parameter i, or each point along the curve, by incrementing i (step 272) until all points on the curve have been evaluated as determined in step 274.

Figure 10:
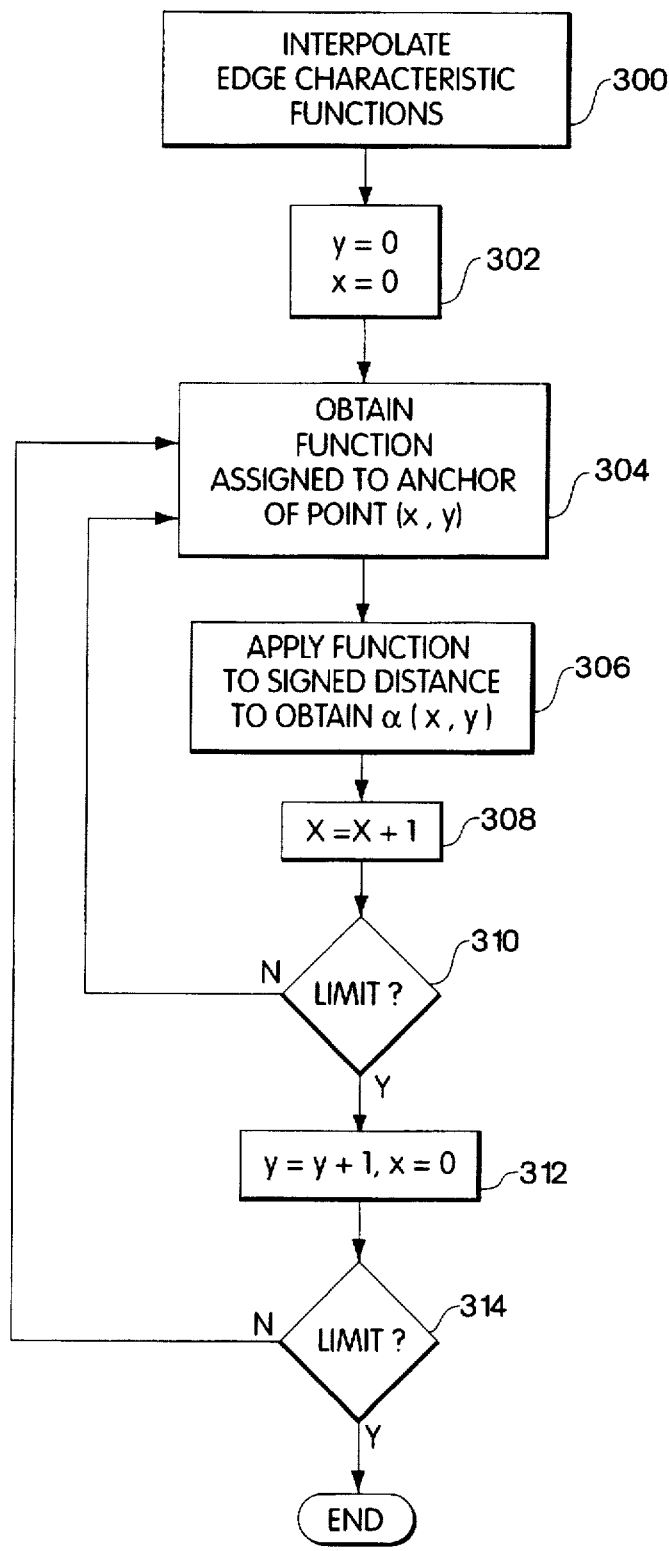
FIG. 10 is a flow chart describing image processing using structured object definitions, variable edge characteristics and anchor and distance values as shown in FIG. 7.

Having now described how the anchor and distance values are determined for points in a region, the use of the boundary definitions, edge characteristics and anchor and distance values by image processor 112 to produce an image 114 will now be described in connection with FIG. 10. Given predefined edge characteristic functions for selected points on the boundary, the first step of image processing is to interpolate these edge characteristic functions (step 300) to determine an edge characteristic function for each point on the boundary. This step is not necessary where the edge characteristic function is independent of the anchor, such as in FIG. 8A or is defined for the entire object as a function of the anchor. Given the parametrization of the curve, there should be an edge characteristic function for each value of the parameter. Next, x and y values are initialized e.g., to zero and zero, respectively, to allow for scan line processing of the image. For each point (x,y), the edge characteristic function assigned to the anchor of that point is selected in step 304. This function is applied to the signed distance for that point in step 306 to obtain a value, herein called α. It should be understood that a boundary within the image may limit the area affected by the edge characteristics. Accordingly, when the distance is greater than some maximum distance, a default color, such as black, should be generated. The combination of all these values a for each point is (x,y) defines the image 114. Next, the x value is incremented in step 308 to further process the scan line. The scan line of steps 304 through 308 are repeated until the end of the scan line is reached as determined in step 310. At the end of the scan line, the y value is incremented in step 312, and the x value is reset to its initial value, e.g., zero. Each scan line is processed by repeating steps 304 through 312 until all the scan lines have been processed as determined in step 314. The image 114 is then complete upon the completion of step 314.

As discussed above, the image processing function may be combined with the anchor and distance calculation. This combination of processing functions can be implemented by inserting steps 304 and 306 between steps 212 and 214 in FIG. 9A for example.

Figure 11:
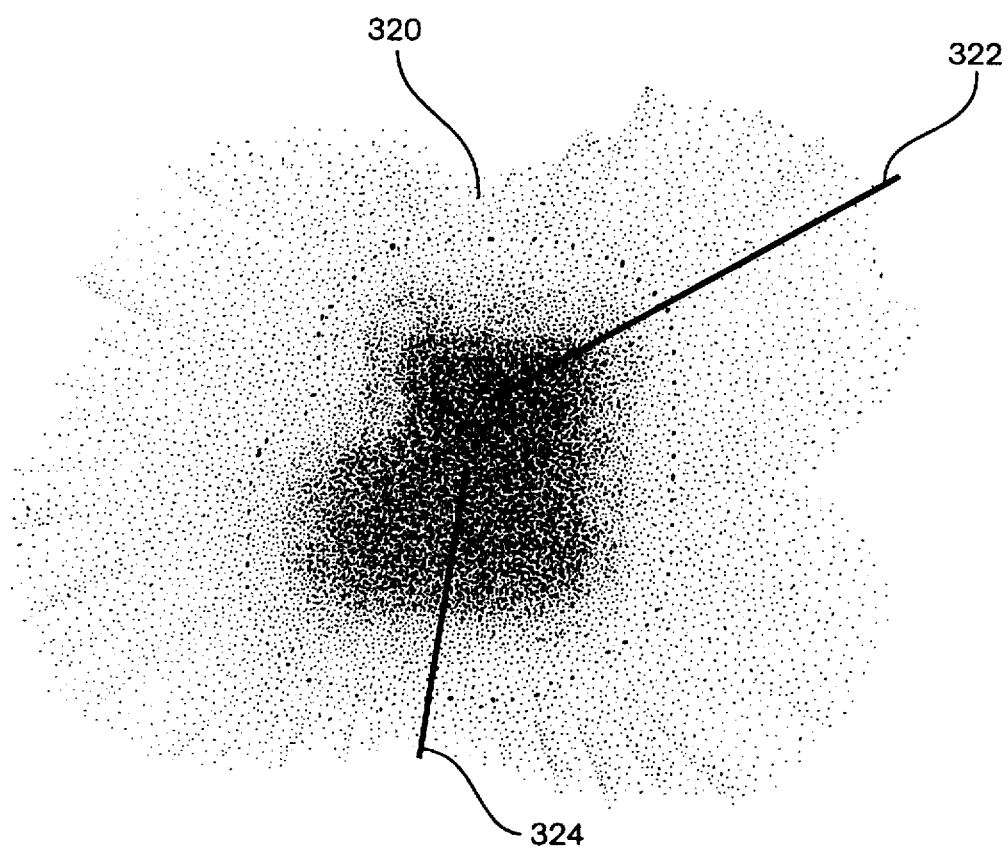
FIG. 11 is a diagram of an example output generated by the image processing module shown in FIG. 7.

FIG. 11 shows an example image that may be generated. This image is defined by an object or curve 320. The edge characteristic defined in a direction indicated by line 322 is a longer greyscale ramp than that indicated, for example, at 324. This figure illustrates that the use of variable edge characteristics which are a function of a point on the curve enables the illustrated effect to be created which is not easily performed by prior art methods.

Figure 12:
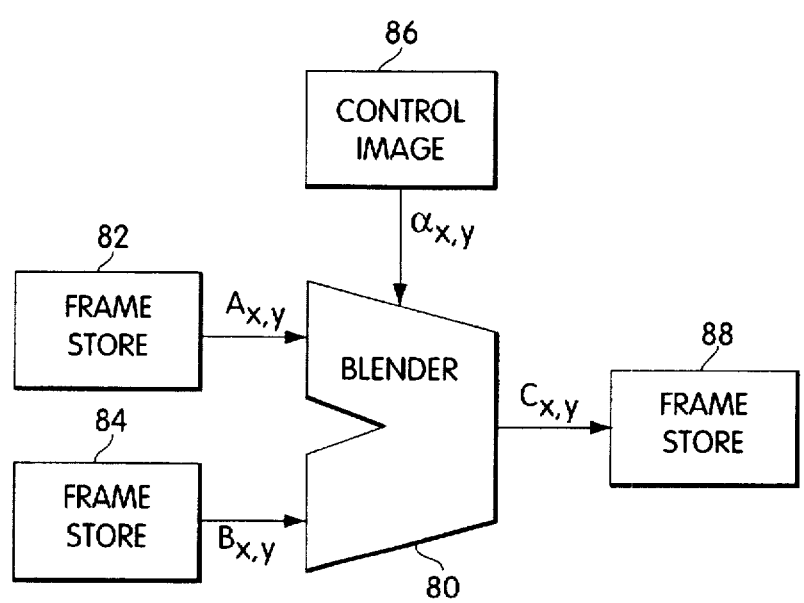
FIG. 12 is a block diagram of an alpha compositing system with which a control image generated using the present invention may be used.

Referring now to FIG. 12, an application of this invention will now be described. FIG. 12 shows a block diagram of a system for alpha compositing of an image. Such a system includes a blender 80 which receives pixel data such as $A_{x,y}$ and $B_{x,y}$ from respective frame stores 82 and 84. A control image is received from frame store 86. The control image provides alpha values $\alpha_{x,y}$ to the blender 80 which then performs the function of equation (1) provided above to output pixels $C_{x,y}$ for the resulting image which is placed in flame store 88.

The compositing system of FIG. 12 may be implemented to process continuous synchronized video signals such as in the Kellar patent, or to process streams of digital video information which are intermittent and flow controlled such as in systems available from Avid Technology, and as described in PCT publication No. 94/24815.

There are other applications of the invention in the representation of images and data. In general, Such applications involve representing values within a coordinate space as a function of the distance to a nearest point on a boundary on that space. As an example, the probability that a point of land may be under water may be defined with reference to a distance to a point at a current boundary of a body of water to which the given point is closest. For example, various points along the boundary may be assigned different probability functions. As an additional example, the movement of a fireball, such as a comet, may be represented as a circle with a long edge characteristic function defining its tail and randomly modified edge characteristics to indicate flames shooting from its core. An image generated by such a representation might be blended into another image using alpha compositing.

More complex images may be defined by using such structured objects with an edge characteristic function that defines a characteristic of a pixel of an image as a function of its distance to a closest point on the structured object. Such an image representation is also readily manipulated to allow for a variety of image processing applications, including, image compositing, special effects, animation and modeling. Additionally, the structured objects in this inven-

What is claimed is:

1. A method for generating an image, comprising the steps of:
   (a) defining a curve in the image as a plurality of points;
   (b) for at least two points in the curve, assigning a function, wherein the function of one of the points is different from the function of another of the points;
   (c) for each picture element in the image, determining an anchor on the curve and a signed distance to the anchor;
   (d) for each picture element, selecting the function assigned to the anchor of the point; and
   (e) for each picture element in the image, applying the selected function to the signed distance from the picture element to the anchor to determine image data for the picture element.

2. The method of claim 1, wherein the step (b) of assigning comprises the steps of:
   defining a boundary in the image;
   selecting a plurality of points on the boundary;
   assigning an edge characteristic function to each selected point; and
   interpolating the edge characteristic function of each of the selected points to obtain edge characteristic functions of other points on the boundary.

3. The method of claim 2, wherein the edge characteristic function is a procedure receiving two arguments, the anchor and the distance.

4. The method of claim 2, wherein the edge characteristic function is applied, by determining, for each point in the region, an anchor point on the curve to which the given point is closest, and a distance to the anchor point.

5. The method of claim 1, wherein the step of applying the function includes calculating for each point, a factor $\alpha$ according to the anchor and the distance, and wherein the image data for the point is a $A+(1-\alpha)\beta$, where A is data from a corresponding point in a first image and B is image data from a corresponding point in a second image.

6. The method of claim 1, wherein an anchor point is a point of the curve closest to the picture element in the image and the step of determining the anchor further includes the steps of:
   initializing coordinates for points on the curve;
   selecting a minimum distance value;
   selecting an anchor point on the curve;
   determining a signed distance between the picture element and the initial anchor point; and
   comparing the signed distance to the minimum distance value.

7. The method of claim 6, wherein the step of comparing further includes the steps of:
   setting the minimum distance value to the signed distance; and
   selecting an anchor for the picture element corresponding to the minimum distance value.

8. The method of claim 6, wherein the step of comparing further includes:
   determining a signed distance between a picture element and each point on the curve;
   comparing the signed distance to the minimum distance of each point on the curve; and
   defining the minimum distance for the picture element and selecting a corresponding anchor.

9. The method of claim 1, wherein the step of determining the anchor further includes the steps of:
   for each scanline,
   generating a first array which is a distance table including current minimum distances to the curve for the point;
   generating a second array which is an anchor table including current closest points on the curve for the point; and
   selecting a color for each point along the scanline according to the distance table and anchor table for the point.

10. The method of claim 9, wherein the steps of generating a first array and a second array includes:
    determining whether the current scanline is within a bounding box defining a region of the image affected by the curve and associated edge characteristics;
    initializing a parameter value of the curve;
    obtaining pixel coordinates of a point corresponding to a current parameter;
    comparing a distance along a y-axis between the point and the current scanline to a maximum distance, the maximum distance representing the distance from the curve in which pixels are affected by the edge characteristics of the curve;
    updating the distance table and the anchor table in the first and second arrays using radial distances form the point for only those points within the maximum distance along an x-axis of the point; and
    incrementing the parameter value until all points on the curve have been evaluated.

11. The method of claim 10, further including the steps of:
    reinitializing the parameter value;
    obtaining coordinates of the point corresponding to the current parameter and the coordinates of a point in the image corresponding to the previous parameter;
    determining an orthogonal projection of the scanline onto a line segment defined by the point representing the current parameter and the point in the image;
    determining the orthogonal distance to the points from the scanline;
    comparing the orthogonal distance to the maximum distance; and
    updating the distance table and anchor table in the first and second arrays between a minimum point on the scanline and a maximum point on the scanline corresponding to the orthogonal projections of the scanline on the line segment defined by the points.

12. The method of claim 10, wherein the step of determining whether the current scanline is within a bounding box includes setting anchor and distance values to default values if the scanline is outside the bounding box.

13. The method of claim 1, wherein the structured object defines a curve for which image values near the curve in a region are defined by the assigned function.

14. A computer-readable medium having a representation of a region of interest within a coordinate space stored thereon in a computer-readable form, the representation comprising:

an indication of a boundary defined by a plurality of points in the region; and for at least two points of the boundary, an indication of an edge characteristic function, wherein the edge characteristic function of a first point on the boundary and the edge characteristic function of a second point on the boundary are different.

15. The computer-readable medium of claim 14, further comprising:

an indication, for each point in the coordinate space, of a point on the boundary to which the point is closest and a signed distance to the point on the boundary.

16. The computer-readable medium of claim 14, wherein the edge characteristic function defines image values near the boundary.

17. The computer-readable medium of claim 16, wherein the edge characteristic function defines a contribution to an image of each point near the boundary as a function of the distance of the point from the boundary.

18. A computer-readable medium having a representation of a region of interest within a coordinate space stored thereon in a computer-readable form, the representation comprising:

an indication of a boundary defined by a plurality of points in the region; and an indication, for each point in the coordinate space, of a point on the boundary to which the point is closest and a signed distance to the point on the boundary.

19. A computer-implemented process for generating a representation of a region of interest in a coordinate space, comprising the steps of:

(a) defining a boundary in response to user input; and (b) receiving user input for at least two point on the boundary, and assigning an edge characteristic function according to the user input, wherein the edge characteristic function of a first point on the boundary and the edge characteristic function of a second point on the boundary are different.

20. The computer-implemented process of claim 19, further including the step of:

interpolating the edge characteristic function of each of the points on the boundary to obtain edge characteristic functions of other points on the boundary.

21. The computer-implemented process of claim 19, further including the steps of:

determining, for each point in the coordinate space, a point on the boundary to which the point is closest and a signed distance to the point on the boundary; and determining a value for each point in the coordinate space based on the edge characteristic function applied to the signed distance.

22. The computer-implemented process of claim 19, wherein the edge characteristic function defines image values near the boundary.

23. A computer system for generating a representation of a region of interest in a finite coordinate space, comprising the steps of:

(a) means for defining a boundary; and (b) means for assigning an edge characteristic function for at least two points on the boundary wherein the edge characteristic function of a first point on the boundary and the edge characteristic function of a second point on the boundary are different.

24. The computer system of claim 23, further including:

means for indicating, for each point in the coordinate space, a point on the boundary to which the point is closest and a signed distance to the point on the boundary; and means for assigning a value for each point in the coordinate space based on the edge characteristic function.

25. The computer system of claim 23, wherein the edge characteristic function defines image values near the boundary.

26. A computer implemented process for manipulating a definition of a region of interest in a coordinate space, wherein the definition is stored using computer-readable signals on a computer-readable medium, and wherein the definition includes an indication of a boundary defined by a plurality of points in the region and an indication, for each point in the coordinate space, of a point on the boundary to which the point is closest and a signed distance to the point on the boundary, the process comprising the steps of:

for each point in the coordinate space having an anchor and a signed distance to that anchor, applying the edge characteristic function assigned to the anchor to the signed distance stored to obtain a value; and displaying the point in the coordinate space according to the obtained value.

27. The computer implemented process of claim 26, wherein the edge characteristic function defines image values near the boundary.

28. A method for generating an image comprising the steps of:

defining a structured object having a boundary of a plurality of points in the image;

defining different edge characteristic functions at different points along the boundary;

identifying a picture element in the image and near the boundary;

determining an anchor point on the boundary associated with the identified picture element;

determining a signed distance from the identified picture element to the anchor point; and applying the edge characteristic function of the anchor point based on the signed distance to generate a value for the identified picture element in the image.

29. The method of claim 28, further including the step of:

interpolating the defined edge characteristic functions to determine an edge characteristic function for each point on the boundary.

30. The method of claim 28, wherein an anchor point is a point of the boundary closest to the identified point and the step of determining the anchor point further includes the steps of:

initializing coordinates for points on the boundary;

selecting a minimum distance value;

selecting an anchor point on the boundary;

determining a signed distance between the identified picture element and the initial anchor point; and comparing the signed distance to the minimum distance value.

31. The method of claim 30, wherein the step of comparing further includes the steps of:

setting the minimum distance value to the signed distance; and selecting an anchor for the picture element corresponding to the minimum distance value.

32. The method of claim 30, wherein the step of comparing further includes the steps of:

determining a signed distance between a picture element and each point on the boundary;

comparing the signed distance to the minimum distance of each point on the boundary; and defining the minimum distance for the picture element and selecting a corresponding anchor.

33. The method of claim 28, wherein the step of determining the anchor further includes the steps of:

for each point in each scanline, generating a first array which is a distance table including current minimum distances to the boundary for the point;

generating a second array which is an anchor table including current closest points on the boundary for the point; and selecting a color for each point along the scanline according to the distance table and anchor table for the point.

34. The method of claim 33, wherein the steps of generating a first array and a second array includes:

determining whether the current scanline is within a bounding box defining a region of the image affected by the boundary and associated edge characteristics;

initializing a parameter value of the boundary;

obtaining pixel coordinates of a point corresponding to a current parameter;

comparing a distance along a y-axis between the point and the current scanline to a maximum distance, the maximum distance representing the distance from the boundary in which pixels are affected by the edge characteristics of the boundary;

updating the distance table and the anchor table in the first and second arrays using radial distances from the point for only those points within the maximum distance along an x-axis of the point; and incrementing the parameter value until all points on the boundary have been evaluated.

35. The method of claim 34, further including the steps of:

reinitializing the parameter value;

obtaining coordinates of the point corresponding to the current parameter and the coordinates of a point in the image corresponding to the previous parameter;

determining an orthogonal projection of the scanline onto a line segment defined by the point representing the current parameter and the point in the image;

determining the orthogonal distance to the points from the scanline;

comparing the orthogonal distance to the maximum distance; and updating the distance table and anchor table in the first and second arrays between a minimum point on the scanline and a maximum point on the scanline corresponding to the orthogonal projections of the scanline on the line segment defined by the points.

36. The method of claim 34, wherein the step of determining whether the current scanline is within a bounding box includes setting anchor and distance values to default values if the scanline is outside the bounding box.

37. The method of claim 28, wherein the step of applying the function includes calculating for each point, a factor a according to the anchor and the distance, and wherein the image data for the point is $\alpha A+(1-\alpha)B$, where A is image data from a corresponding point in a first image and B is image data from a corresponding point in a second image.

38. The method of claim 28, wherein the edge characteristic function defines image values near the boundary.

* * * * *